(12) United States Patent
Lynch

(10) Patent No.: US 12,544,011 B2
(45) Date of Patent: Feb. 10, 2026

(54) SYSTEM COMPRISING AN ELECTRONICS MODULE

(71) Applicant: Prevayl Innovations Limited, Manchester (GB)

(72) Inventor: Michael John Lynch, Cheshire (GB)

(73) Assignee: Prevayl Innovations Limited, Wilmslow (GB)

( * ) Notice: Subject to any disclaimer, the term of this patent is extended or adjusted under 35 U.S.C. 154(b) by 446 days.

(21) Appl. No.: 18/006,467

(22) PCT Filed: Jul. 29, 2021

(86) PCT No.: PCT/GB2021/051954
§ 371 (c)(1),
(2) Date: Jan. 23, 2023

(87) PCT Pub. No.: WO2022/023750
PCT Pub. Date: Feb. 3, 2022

(65) Prior Publication Data
US 2023/0263475 A1  Aug. 24, 2023

(30) Foreign Application Priority Data
Jul. 31, 2020  (GB) ..................................... 2011933

(51) Int. Cl.
*A61B 5/00* (2006.01)
*A61B 5/282* (2021.01)

(52) U.S. Cl.
CPC ............ *A61B 5/7221* (2013.01); *A61B 5/282* (2021.01); *A61B 5/6804* (2013.01); *A61B 5/7405* (2013.01); *A61B 5/742* (2013.01); *A61B 5/7455* (2013.01)

(58) Field of Classification Search
CPC ..... A61B 5/7221; A61B 5/282; A61B 5/6804; A61B 5/7405; A61B 5/742; A61B 5/7455
(Continued)

(56) References Cited

U.S. PATENT DOCUMENTS

| 2011/0288604 A1 | 11/2011 | Kaib |
| 2012/0146797 A1* | 6/2012 | Oskin .................. A61N 1/3918 340/573.1 |

(Continued)

FOREIGN PATENT DOCUMENTS

| EP | 3609026 | 2/2020 |
| GB | 2597726 | 2/2022 |

OTHER PUBLICATIONS

International Search Report received in PCT/GB2021/051954 mailed Oct. 25, 2021.

(Continued)

*Primary Examiner* — Kam Wan Ma
(74) *Attorney, Agent, or Firm* — Suzannah K. Sundby, Esq.; Canady + Lortz LLP

(57) ABSTRACT

The system 10 comprises an electronics module 100 removably mechanically coupled to a 5 wearable article 200. The electronics module 100 forms a communicative connection with the wearable article 200 to receive measurement data from the wearable article 200. A processor analyses measurement data obtained when the electronics module 100 is mechanically coupled with the wearable article 200 to determine whether an anomaly condition is present. The anomaly condition is indicative of an anomaly in the communicative connection between the electronics module 100 and the wearable article 200. If the anomaly condition is present, the processor triggers the generation of a notification to prompt the user to adjust the mechanical coupling between the electronics module 100 and the wearable article 200 so as to adjust the communicative connection between the electronics module 100 and the wearable article 200.

17 Claims, 9 Drawing Sheets

(58) Field of Classification Search
USPC .................................................. 340/539.12
See application file for complete search history.

(56) References Cited

U.S. PATENT DOCUMENTS

| | | | |
|---|---|---|---|
| 2014/0275857 A1 | 9/2014 | Toth | |
| 2017/0011210 A1* | 1/2017 | Cheong | .................. A61B 5/681 |
| 2019/0086465 A1 | 3/2019 | Parchak | |
| 2020/0060545 A1 | 2/2020 | Maher | |
| 2020/0230429 A1 | 7/2020 | Oskin | |
| 2023/0293942 A1* | 9/2023 | Hunter | .................. A63B 53/005 |
| | | | 700/91 |
| 2024/0180498 A1* | 6/2024 | Lajunen | ................ A61B 5/6802 |

OTHER PUBLICATIONS

Written Opinion received in PCT/GB2021/051954 mailed Oct. 25, 2021.
Examination Report received in GB2597726 Dec. 21, 2022.
Search Report received in GB2597726 mailed Jan. 14, 2021.
Search Report received in GB2597922 mailed Jan. 26, 2021.

* cited by examiner

SYSTEM COMPRISING AN ELECTRONICS MODULE

The present invention is directed towards a system comprising an electronics module.

BACKGROUND

Wearable articles can be designed to interface with a wearer of the article, and to determine information such as the wearer's heart rate, rate of respiration, activity level, and body positioning. Such properties can be measured with a sensor assembly that includes a sensor for signal transduction and/or microprocessors for analysis. The articles include electrically conductive pathways to allow for signal transmission between a removable electronics module for processing and communication and sensing components of the article. The wearable articles may be garments. Such garments are commonly referred to as 'smart clothing' and may also be referred to as 'biosensing garments' if they measure biosignals.

It is desirable to overcome at least some of the problems associated with the prior art, whether explicitly discussed herein or otherwise.

SUMMARY

According to the present disclosure there is provided an electronics module and an apparatus as set forth in the appended claims. Other features of the invention will be apparent from the dependent claims, and the description which follows.

According to a first aspect of the disclosure, there is provided a system. The system comprises an electronics module arranged to be removably mechanically coupled to a wearable article, the electronics module forms a communicative connection with the wearable article so as to receive measurement data from the wearable article when the electronics module is mechanically coupled to the wearable article. The system comprises at least one processor operable to: analyse measurement data obtained when the electronics module is mechanically coupled with the wearable article to determine whether an anomaly condition is present, wherein the anomaly condition is indicative of an anomaly in the communicative connection between the electronics module and the wearable article; and if the anomaly condition is present, trigger the generation of a notification to prompt the user to adjust the mechanical coupling between the electronics module and the wearable article so as to adjust the communicative connection between the electronics module and the wearable article.

The measurement data obtained when the electronics module is mechanically coupled with the wearable article may be measurement data obtained by the electronics module or a further device such as a mobile device.

The measurement data analysed by the at least one processor may comprise measurement data received by the electronics module over the communicative connection between the electronics module and the wearable article.

The processor being operable to analyse the measurement data may comprises the processor being operable to determine a signal-quality measure of the measurement data.

The processor being operable to determine the signal-quality measure may comprises the processor being operable to determine an amplitude of the measurement data.

The processor may be operable to compare the signal-quality measure to a predetermined threshold value so as to determine whether the anomaly condition is present. The anomaly condition may be present if the signal quality measure is less than the predetermined threshold value.

The predetermined threshold may be determined based on one or more characteristics of the user.

The measurement data analysed by the at least one processor may comprise measurement data obtained by a sensor. The sensor may be a sensor of the electronics module, a sensor communicatively coupled to the electronics module, a sensor of the wearable article, or a sensor of a further device.

The sensor may comprise a motion sensor. The motion sensor may be a motion sensor of the electronics module. The measurement data may be indicative of the orientation of the electronics module with respect to the wearable article.

The at least one processor may be operable to compare the orientation of the electronics module to a reference position. The anomaly condition may be present if the electronics module is orientated away from the reference position by more than a predetermined value.

The sensor may comprise a temperature sensor. The temperature sensor may sense a skin surface or core body temperature of the user. The temperature sensor may sense an external, environmental temperature such as an ambient temperature. The temperature sensor may be a sensor of the electronics module, a sensor communicatively coupled to the electronics module, a sensor of the wearable article, or a sensor of a further device. The measured temperature may be indicative of there being an anomaly in the communicative connection between the electronics module and the wearable article. A temperature which is outside of an expected range may indicate an anomaly in the communicate connection, for example.

The sensor may comprise a humidity/moisture sensor. The humidity/moisture sensor may sense a humidity/moisture level at a skin surface of the user such as due to sweat generation. The humidity/moisture sensor may sense an environmental humidity/moisture level at a skin surface of the user such as due to weather, location, and climate conditions. The measured humidity/moisture level may be indicative of there being an anomaly in the communicative connection between the electronics module and the wearable article. The humidity/moisture sensor may be a sensor of the electronics module, a sensor communicatively coupled to the electronics module, a sensor of the wearable article, or a sensor of a further device.

The sensor may comprise a location sensor. The location sensor may determine the location of the wearable article, and/or electronics module, and/or a further device. The measured location may be indicative of there being an anomaly in the communicative connection between the electronics module and the wearable article. The location sensor may be a sensor of the electronics module, a sensor communicatively coupled to the electronics module, a sensor of the wearable article, or a sensor of a further device.

The sensor may comprise an environmental sensor to measure one or more properties of the environment in which the user is located. The environmental sensor may be a sensor of the electronics module, a sensor communicatively coupled to the electronics module, a sensor of the wearable article, or a sensor of a further device.

The electronics module may comprise an interface that forms the communicative connection with the wearable article.

The interface may be brought into proximity or contact with the wearable article so as to form the communicative connection with the wearable article.

The interface may be brought into contact with a connection region of the wearable article. The interface and the connection region may comprise conductive materials so as to form a conductive coupling, and wherein the measurement data is received over the conductive coupling.

The interface may comprise a plurality of interface elements that each form a communicative connection with the wearable article.

The processor being operable to trigger the generation of a notification may comprise the processor controlling an output unit to generate an output for prompting the user to adjust the mechanical coupling between the electronics module and the wearable article. The output may comprise one or more of an audio output, a visual output, and a haptic output.

The system may further comprise the output unit.

The electronics module may comprise the output unit.

A further device may comprise the output unit.

The electronics module may comprise the at least one processor.

The processor being operable to trigger the generation of a notification may comprise the processor being operable to control the electronics module to transmit the notification to a further device.

The system may further comprise a further device communicatively coupled to the electronics module.

The system may further comprise a further device communicatively coupled to the electronics module. The further device is arranged to receive the measurement data from the electronics module. The further device may comprise the at least one processor.

The further device is a mobile device.

The system may further comprise the wearable article. The wearable article may be a garment.

The electronics module may comprise a housing. The electronics module may comprise a contact pad. The contact pad may comprise a conductive material. The contact pad may comprise an elastomeric material. The contact pad may comprise a conductive elastomeric material.

The housing may comprise an opening for receiving at least part of the contact pad. The housing may comprise a first enclosure and a second enclosure which are connected to one another. The first enclosure and the second enclosure may be connected to one another using a snap-fit mechanism.

According to a second aspect of the disclosure, there is provided an electronics module arranged to be removably mechanically coupled to a wearable article. The electronics module forms a communicative connection with the wearable article so as to receive measurement data from the wearable article when the electronics module is mechanically coupled to the wearable article. The electronics module comprises at least one processor operable to: analyse measurement data obtained by the electronics module when the electronics module is mechanically coupled with the wearable article to determine whether an anomaly condition is present, wherein the anomaly condition is indicative of an anomaly in the communicative connection between the electronics module and the wearable article; and if the anomaly condition is present, and trigger the generation of a notification to prompt the user to adjust the mechanical coupling between the electronics module and the wearable article so as to adjust the communicative connection between the electronics module and the wearable article.

According to a third aspect of the disclosure, there is provided a method. The method comprises forming a removable mechanical coupling between an electronics module and a wearable article, wherein the electronics module forms a communicative connection with the wearable article so as to receive measurement data from the wearable article when the electronics module is mechanically coupled to the wearable article; analysing measurement data obtained when the electronics module is mechanically coupled with the wearable article to determine whether an anomaly condition is present, wherein the anomaly condition is indicative of an anomaly in the communicative connection between the electronics module and the wearable article; and triggering the generation of a notification to prompt the user to adjust the mechanical coupling between the electronics module and the wearable article so as to adjust the communicative connection between the electronics module and the wearable article.

According to a fourth aspect of the disclosure, there is provided a system. The system comprises an electronics module arranged to be removably mechanically coupled to a wearable article, the electronics module forms a communicative connection with the wearable article so as to receive measurement data from the wearable article when the electronics module is mechanically coupled to the wearable article; and at least one processor operable to: analyse measurement data obtained when the electronics module is mechanically coupled with the wearable article to determine whether an anomaly condition is present, wherein the anomaly condition is indicative of an anomaly in the communicative connection between the electronics module and the wearable article; and if the anomaly condition is present, trigger a compensation to be applied to obtained measurement data so as to compensate for the anomaly in the communicative connection between the electronics module and the wearable article.

The measurement data obtained when the electronics module is mechanically coupled with the wearable article may be measurement data obtained by the electronics module. The compensation may be applied to measurement data obtained by the electronics module.

Thee compensation may be applied to the measurement data received by the electronics module from the wearable article.

Triggering a compensation to be applied to the measurement data may comprise determining a scaling factor to be applied to the obtained measurement data to compensate for the anomaly in the communicative connection between the electronics module and the wearable article. The measurement data may be scaled by the determined scaling factor.

The scaling factor may be determined by comparing the obtained measurement data to characteristic measurement data.

The characteristic measurement data may be specific to a user of the electronics module.

If the anomaly condition is present, the method further comprises determining whether the obtained measurement data corresponds to characteristic measurement data, and if the measurement data does correspond to characteristic measurement data, the at least one processor is operable to trigger a compensation to be applied to the measurement data so as to compensate for the anomaly in the communicative connection between the electronics module and the wearable article.

If the measurement data does not correspond to characteristic measurement data, the at least one processor may be operable to trigger the generation of the notification to prompt the user to adjust the mechanical coupling between the electronics module and the wearable article so as to adjust the communicative connection between the electronics module and the wearable article.

The at least one processor may be operable to trigger the generation of the notification only if the measurement data does not correspond to characteristic measurement data.

Determining whether the measurement data corresponds to characteristic measurement data may comprise comparing a shape of the measurement data to a shape of the characteristic measurement data.

The characteristic measurement data may be specific to a user of the electronics module.

The system may comprise any or all of the features of the system of the first aspect of the disclosure.

According to a fifth aspect of the disclosure, there is provided a method comprising: forming a removable mechanical coupling between an electronics module and a wearable article, wherein the electronics module forms a communicative connection with the wearable article so as to receive measurement data from the wearable article when the electronics module is mechanically coupled to the wearable article; and analysing measurement data when the electronics module is mechanically coupled with the wearable article to determine whether an anomaly condition is present, wherein the anomaly condition is indicative of an anomaly in the communicative connection between the electronics module and the wearable article; and triggering a compensation to be applied to obtained measurement data so as to compensate for the anomaly in the communicative connection between the electronics module and the wearable article.

The wearable article according to aspects of the present disclosure may comprise one or more sensing components. The sensing components may be biosensing components. The sensing components may comprise one or more components of a temperature sensor, a humidity sensor, a motion sensor, an electropotential sensor, an electroimpedance sensor, an optical sensor, an acoustic sensor. Here, "component" means that not all of the components of the sensor may be provided in the wearable article. The processing logic, power and other functionality may be provided in the electronics module. The wearable article may only comprise the minimal functionality to perform the sensing such as by only including sensing electrodes. The temperature sensor may be arranged to measure an ambient temperature, a skin temperature of a human or animal body, or a core temperature of a human or animal body. The humidity sensor may be arranged to measure humidity or skin-surface moisture levels for a human or animal body. The motion sensor may comprise one or more of an accelerometer, a gyroscope, and a magnetometer sensor. The motion sensor may comprise an inertial measurement unit. The electropotential sensor may be arranged to perform one or more bioelectrical measurements. The electropotential sensor may comprise one or more of electrocardiography (ECG) sensor modules, electrogastrography (EGG) sensor modules, electroencephalography (EEG) sensor modules, and electromyography (EMG) sensor modules. The electroimpedance sensor may be arranged to perform one or more bioimpedance measurements. Bioimpedance sensors can include one or more of plethysmography sensor modules (e.g., for respiration), body composition sensor modules (e.g., hydration, fat, etc.), and electroimpedance tomography (EIT) sensors. An optical sensor may comprise a photoplethysmography (PPG) sensor module or an orthopantomogram (OPG) sensor module.

The present disclosure is not limited to wearable articles. The electronics arrangement disclosed herein may be incorporated into other forms of devices such as user electronic devices (e.g. mobile phones). In additions, they may be incorporated into any form of textile article. Textile articles may include upholstery, such as upholstery that may be positioned on pieces of furniture, vehicle seating, as wall or ceiling decor, among other examples.

BRIEF DESCRIPTION OF THE DRAWINGS

Examples of the present disclosure will now be described with reference to the accompanying drawings, in which.

DETAILED DESCRIPTION

Figure 1:
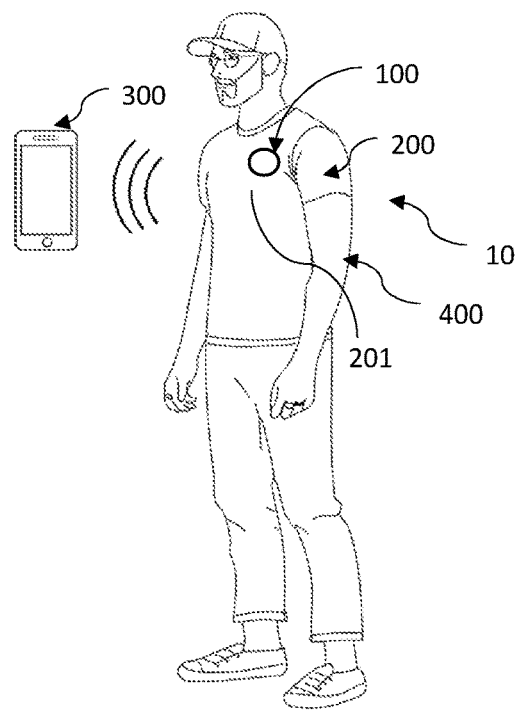
FIG. 1 shows a schematic diagram for an example system according to aspects of the present disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

"Wearable article" as referred to throughout the present disclosure may refer to any form of electronic device which may be worn by a user such as a smart watch, necklace, bracelet, headphones, in-ear headphones, or glasses. The wearable article may be a textile article. The wearable article may be a garment. The garment may refer to an item of clothing or apparel. The garment may be a top. The top may be a shirt, t-shirt, blouse, sweater, jacket/coat, or vest. The garment may be a dress, brassiere, shorts, pants, arm or leg sleeve, vest, jacket/coat, glove, armband, underwear, headband, hat/cap, collar, wristband, stocking, sock, or shoe, athletic clothing, swimwear, personal protection equipment, wetsuit or drysuit.

The wearable article/garment may be constructed from a woven or a non-woven material. The wearable article/garment may be constructed from natural fibres, synthetic fibres, or a natural fibre blended with one or more other materials which can be natural or synthetic. The yarn may be cotton. The cotton may be blended with polyester and/or viscose and/or polyamide according to the particular application. Silk may also be used as the natural fibre. Cellulose, wool, hemp and jute are also natural fibres that may be used in the wearable article/garment. Polyester, polycotton, nylon and viscose are synthetic fibres that may be used in the wearable article/garment.

The garment may be a tight-fitting garment. Beneficially, a tight-fitting garment helps ensure that the sensor devices of the garment are held in contact with or in the proximity of a skin surface of the wearer. The garment may be a compression garment. The garment may be an athletic garment such as an elastomeric athletic garment. The present disclosure is not limited to wearable articles for humans and includes wearable articles for animals such as animal collars, jackets and sleeves.

The following description refers to particular examples of the present disclosure where the wearable article is a garment. It will be appreciated that the present disclosure is not limited to garments and other forms of wearable article are within the scope of the present disclosure as outlined above.

Referring to FIG. 1, there is shown an example system 10 according to aspects of the present disclosure. The system 10 comprises an electronics module 100, a garment 200, and a mobile device 300. The garment 200 is worn by a user 400. The electronics module 100 is attached to the garment 200. The electronics module 100 is shown positioned on a textile layer 201 of the garment 200 in FIG. 1. The electronics module 100 may be positioned within a pocket or similar mounting arrangement of the garment 200.

The electronics module 100 is arranged to integrate with sensing components incorporated into the garment 200 so as to obtain signals from the sensing components. The sensing components may comprise electrodes. The electronics module 100 is further arranged to wirelessly communicate data to the mobile device 300. Various protocols enable wireless communication between the electronics module 100 and the mobile device 300. Example communication protocols include Bluetooth®, Bluetooth® Low Energy, and near-field communication (NFC). In some examples, the electronics module 100 may communicate over a long-range wireless communication protocol.

The electronics module 100 is removable from the garment 200. The mechanical coupling of the electronic module 100 to the garment 200 may be provided by a mechanical interface such as a clip, a plug and socket arrangement, pocket etc. The mechanical interface may be referred to as an electronics module holder of the garment 200.

Beneficially, the removable electronic module 100 may contain all of the components required for data transmission and processing such that the garment 200 only comprises the sensor components and communication pathways. In this way, manufacture of the garment 200 may be simplified. In addition, it may be easier to clean a garment 200 which has fewer electronic components attached thereto or incorporated therein. Furthermore, the removable electronic module 100 may be easier to maintain and/or troubleshoot than embedded electronics. The electronic module 100 may comprise flexible electronics such as a flexible printed circuit (FPC). The electronic module 100 may be configured to be electrically coupled to the garment 200.

It may be desirable to avoid direct contact of the electronic module 100 with the wearer's skin while the garment 200 is being worn. It may be desirable to avoid the electronic module 100 coming into contact with sweat or moisture on the wearer's skin or other sources of moisture such as from rain or a shower. It may further be desirable to provide an electronics module holder such as a pocket in the garment to contain the electronic module 100 in order to prevent chafing or rubbing and thereby improve comfort for the wearer. The pocket may be provided with a waterproof lining in order to prevent the electronic module 100 from coming into contact with moisture.

Figure 2:
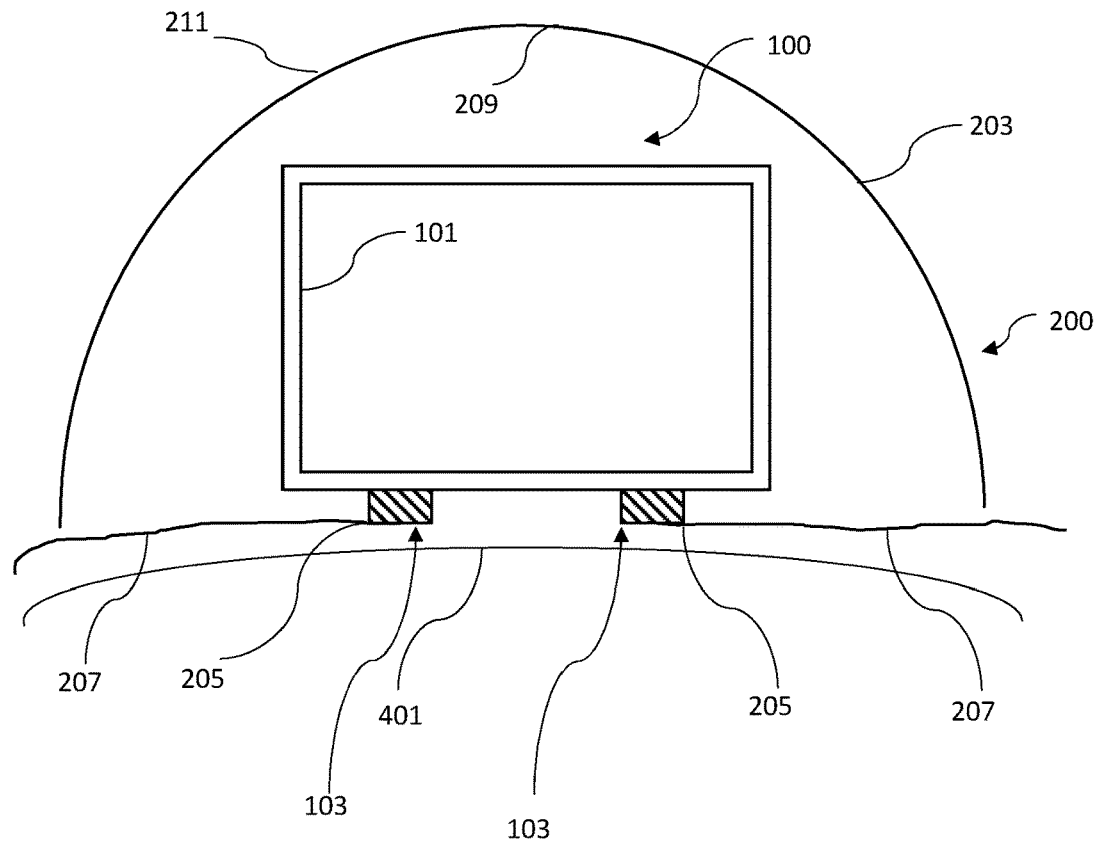
FIG. 2 shows a sectional view of an example apparatus comprising an electronics module and a wearable article according to aspects of the present disclosure.

Referring to FIG. 2, there is shown a sectional view of an apparatus comprising a garment 200 and an electronics module 100 disposed within an electronics module holder 203 of the garment 200. The garment 200 is being worn by a user and is proximate to the skin surface 401 of the user.

The electronics module holder 203 in this example is an elasticated pocket 203 positioned on the outside surface of the garment 200. In other examples, the electronics module holder 203 may be provided within the garment 200 such as in the form of an inner pocket.

The pocket 203 allows the user to position the electronics module 100 in the pocket 203 and remove it therefrom. The pocket 203 applies a compressive force to help hold the electronics module 100 in a generally fixed position within the pocket 203. This is not required in all examples as gripping surfaces of the electronics module 100 and/or the garment 200/pocket 203 may be sufficient for limiting relative movement between the electronics module 100 and the garment 200. Additionally or separately, the electronics module 100 and the garment 200 may comprise magnetic elements to help hold the electronics module 100 in a fixed position relative to the garment 200. The housing of the electronics module 100 may be constructed to enable a magnet to be retained therein. In particular, a recess may be provided in an inner surface of a bottom enclosure of an electronics module 100 sized to retain a magnet. While the above and similar structures can help restrict relative movement between the electronics module 100 and the garment 200, the electronics module 100 may still shift due to user motion or incorrect placement by the user as explained in more detail below.

The pocket 203 comprises a layer of material 203 which is bonded, stitched, otherwise attached to or integrally formed with the garment 200. The pocket 203 has an inner surface 209 facing the electronics module 100. The pocket 203 has an outer surface 211 which can be considered as part of the outer surface 201, 211 of the garment 200.

The electronics module 100 comprises a housing 101 formed of a rigid material in this example. One or more electrical components are provided within the rigid housing 101. The housing 101 may comprise a (rigid) polymeric material. The polymeric material may be a rigid plastic material. The rigid plastic material may be ABS or polycarbonate plastic but is not limited to these examples. The rigid plastic material may be glass reinforced. The rigid housing 101 may be injection moulded. The rigid housing 101 may be constructed using a twin-shot injection moulding approach.

A plurality (two in this example) of contact pads 103 are provided on the outer surface of the housing 101. The contact pads 103 are formed from a flexible material, but this is not required in all examples. The contact pads 103 are spaced apart from one another on the bottom surface of the housing 101. "Rigid" will be understood as referring to a material which is stiffer and less able to bend than the contact pads 103 formed of flexible material. The rigid housing 101 may still have some degree of flexibility but is less flexible than the flexible material of the contact pads 103.

The contact pads 103 comprise conductive material, and thus acts as conductive contact pads 103 for the electronics module 100. The flexible conductors 103 therefore provide the interface by which the electronics module 100 is able to receive signals from an external component such as the garment 200.

The contact pads 103 conductively connect with connection regions 205 of the garment 200. Each of the contact pads 103 is conductively connected with a different one of the connection regions 205. The connection regions 205 are not conductively connected together. The connection regions 205 enable the electronics module 100 to conductively connect to sensing components of the garment 200 via electrically conductive pathways 207. The sensing components may be one or more electrodes.

The electrically conductive pathways 207 and connection regions 205 may be formed from any form of conductive material such as conductive thread or wire. The conductive thread or wire may be woven or otherwise incorporated into a tape or fabric panel. The electrically conductive pathways 207 and connection regions 205 may be electrically conductive tracks or films. The electrically conductive pathways 207 and connection regions 205 may be conductive transfers. The conductive material may be formed from a fibre or yarn of the textile. This may mean that electrically conductive materials are incorporated into the fibre/yarn. The conductive material may be a conductive rubber.

The use of flexible conductors 103 is generally preferred as compared to rigid, metallic, conductors 103 as this means that hard pieces of conductive metallic material such as poppers or studs are not required to electrically connect the electronics module 100 to the garment 200. This not only improves the look and feel of the garment 200 but also reduces manufacturing costs as it means that hardware features such as additional eyelets and studs do not need to be incorporated into the garment 200 to provide the required connectivity. An additional problem with rigid metallic conductors is that their hard, abrasive, surfaces may rub against conductive elements such as conductive thread of the garment and cause the conductive thread to fray.

Figure 3:
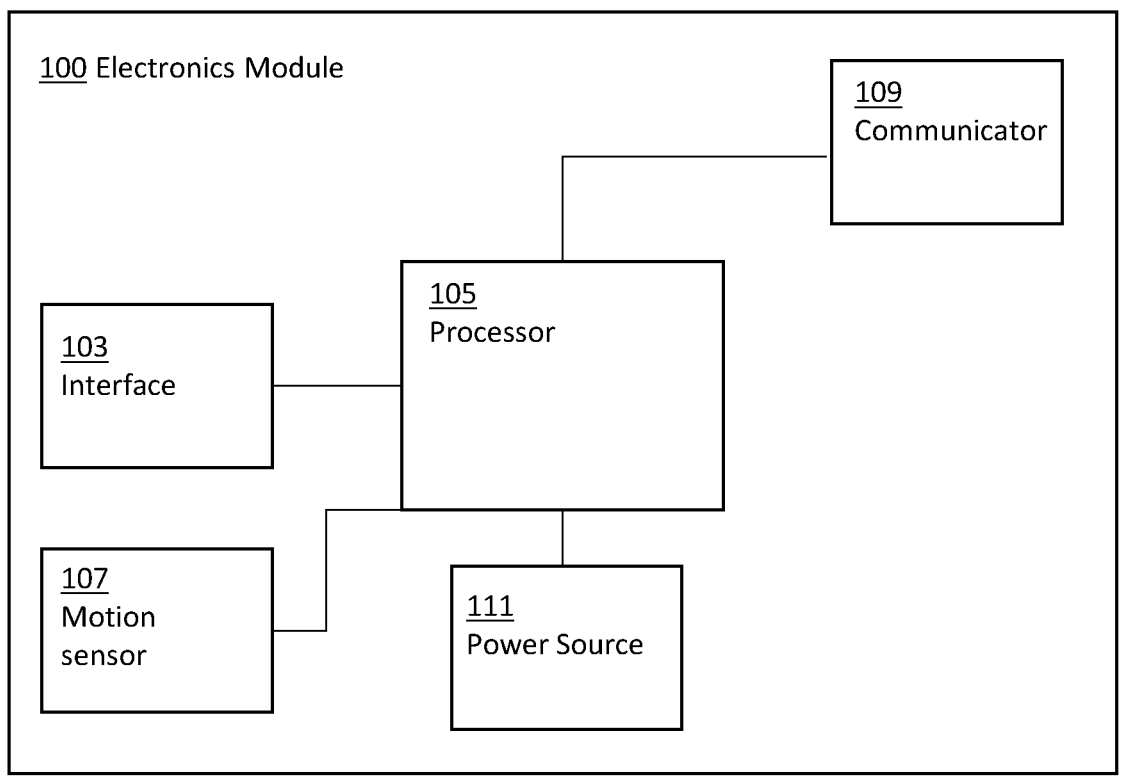
FIG. 3 shows a schematic diagram for an example electronics module according to aspects of the present disclosure.

Referring to FIG. 3, there is shown a schematic diagram for an example electronics module 100 according to aspects of the present disclosure.

The electronics module comprises an interface 103. The interface 103 is arranged to communicatively couple with a sensing component of the garment 200 (FIG. 1) so as to receive a signal from the sensing component or may directly interface with a skin surface of the wearer to receive signals therefrom. The interface 103 may form a conductive coupling or a wireless (e.g. inductive) communication coupling with the electronics components of the garment 200. The interface 103 may comprise the contact pads 103 of FIG. 2.

The electronics module 100 comprises a processor 105. The processor 105 is communicatively coupled to the interface 103 and is arranged to receive the signals from the interface 103. The processor 105 is configured to process signals sensed by a sensing component of the electronics module 100 and/or the garment 200. The signals relate to the activity of a user wearing the garment 200.

The electronics module 100 comprises a motion sensor 107 such as an inertial measurement unit 107. The inertial measurement unit 107 may comprise an accelerometer and optionally one or both of a gyroscope and a magnetometer. A gyroscope/magnetometer is not required in all examples, and instead only an accelerometer may be provided or a gyroscope/magnetometer may be present but put into a low power state. A processor of the sensor 107 may perform processing tasks to classify different types of detected motion. The processor of the sensor 107 may, in particular, perform machine-learning functions so as to perform this classification. Performing the processing operations on the sensor 107 rather than the processor 105 is beneficial as it reduces power consumption and leaves the processor 105 free to perform other tasks. In addition, it allows for motion events to be detected even when the processor 105 is operating in a low power mode. The sensor 107 communicates with the processor 105 over a serial protocol such as the Serial Peripheral Interface (SPI), Inter-Integrated Circuit (I2C), Controller Area Network (CAN), and Recommended Standard 232 (RS-232). Other serial protocols are within the scope of the present disclosure.

The electronics module 100 comprises a communicator 109. The communicator 109 may be a mobile/cellular communicator operable to communicate the data wirelessly via one or more base stations. The communicator 109 may provide wireless communication capabilities for the garment 200 and enables the garment 200 to communicate via one or more wireless communication protocols such as used for communication over: a wireless wide area network (WWAN), a wireless metroarea network (WMAN), a wireless local area network (WLAN), a wireless personal area network (WPAN), Bluetooth® Low Energy, Bluetooth® Mesh, Bluetooth® 5, Thread, Zigbee, IEEE 802.15.4, Ant, a near field communication (NFC), a Global Navigation Satellite System (GNSS), a cellular communication network, or any other electromagnetic RF communication protocol. The cellular communication network may be a fourth generation (4G) LTE, LTE Advanced (LTE-A), LTE Cat-M1, LTE Cat-M2, NB-IoT, fifth generation (5G), sixth generation (6G), and/or any other present or future developed cellular wireless network. A plurality of communicators may be provided for communicating over a combination of different communication protocols.

The electronics module 100 may comprise a Universal Integrated Circuit Card (UICC) that enables the electronics module 100 to access services provided by a mobile network operator (MNO) or virtual mobile network operator (VMNO). The UICC may include at least a read-only memory (ROM) configured to store an MNO/VMNO profile that the wearable article can utilize to register and interact with an MNO/VMNO. The UICC may be in the form of a Subscriber Identity Module (SIM) card. The electronics module 100 may have a receiving section arranged to receive the SIM card. In other examples, the UICC is embedded directly into a controller of the electronics module 100. That is, the UICC may be an electronic/embedded UICC (eUICC). A eUICC is beneficial as it removes the need to store a number of MNO profiles, i.e. electronic Subscriber Identity Modules (eSIMs). Moreover, eSIMs can be remotely provisioned to electronics modules 100. The electronics modules 100 may comprise a secure element that represents an embedded Universal Integrated Circuit Card (eUICC).

The electronics module 100 comprises a power source 111. The power source 111 is coupled to the processor 105 and is arranged to supply power to the processor 105. The power source 111 may comprise a plurality of power sources. The power source 111 may be a battery. The battery may be a rechargeable battery. The battery may be a rechargeable battery adapted to be charged wirelessly such as by inductive charging. The power source 111 may comprise an energy harvesting device. The energy harvesting device may be configured to generate electric power signals in response to kinetic events such as kinetic events performed by a wearer of the garment. The kinetic event could include walking, running, exercising or respiration of the wearer. The energy harvesting material may comprise a piezoelectric material which generates electricity in response to mechanical deformation of the converter. The energy harvesting device may harvest energy from body heat of a wearer of the garment. The energy harvesting device may be a thermoelectric energy harvesting device. The power source may be a super capacitor, or an energy cell.

The electronics module 100 is mounted on a garment 200 (FIG. 1) and conductively connected to sensing components such as electrodes of the garment via electrically conductive pathways of the garment 200. In a particular example, the sensing components are electrodes used to measure electro potential signals such as electrocardiogram (ECG) signals.

Figure 4:
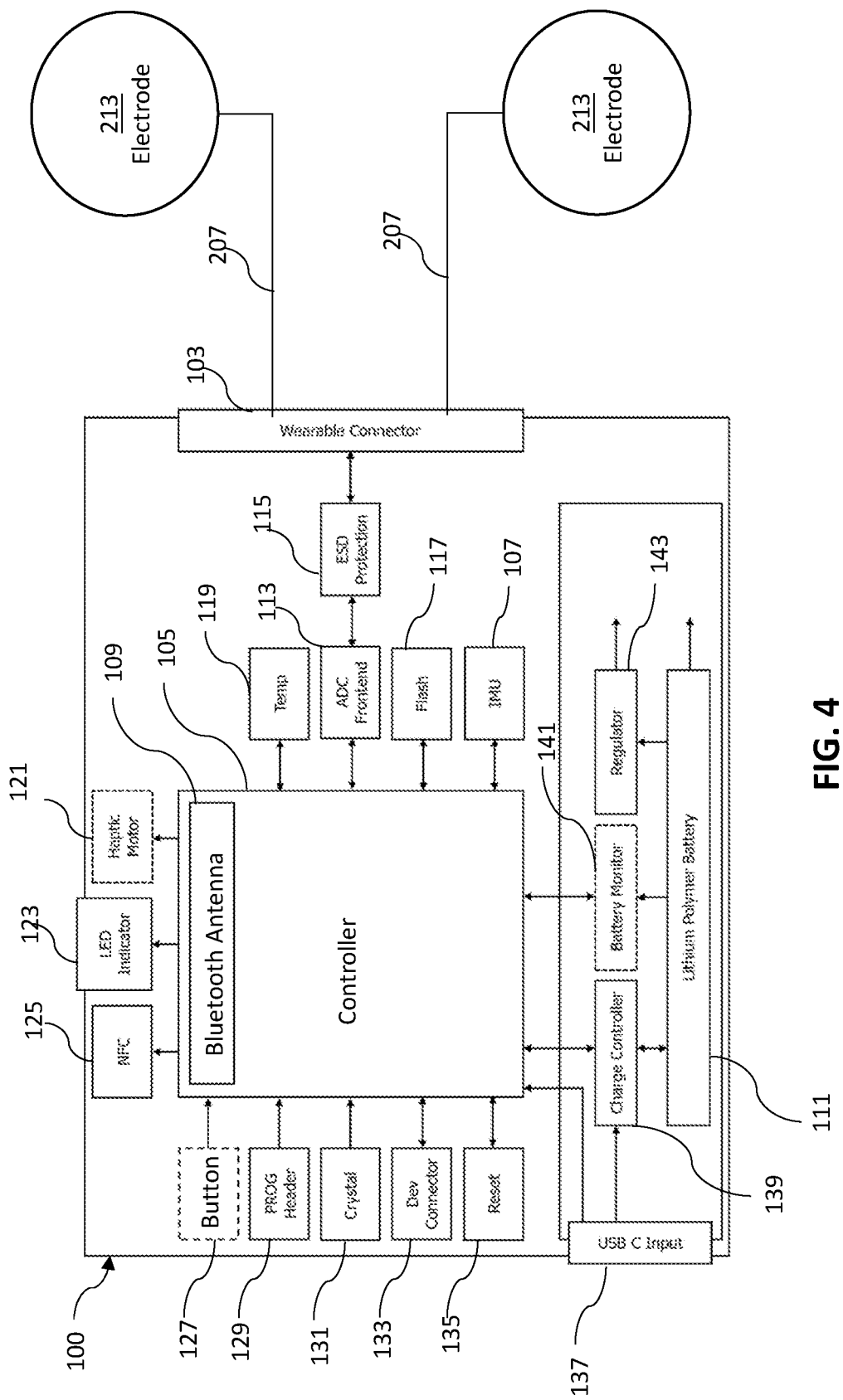
FIG. 4 shows a schematic diagram for an example electronics module according to aspects of the present disclosure.

Referring to FIG. 4, there is shown a schematic diagram for an example electronics module 100 according to aspects of the present disclosure. The electronics module 100 comprises the interface 103, processor 105, motion sensor 107, communicator 109, and power source 111 of FIG. 3.

The processor 105 is a component of a controller 105 such as a microcontroller. The controller 105 has an integral communicator 109 which, in this example comprises a Bluetooth® antenna. The controller 105 may have an internal memory and may also be communicatively connected to an external memory 117 of the electronics module such as a NAND Flash memory 117. The memory 117 is used to for the storage of data such as when no wireless connection is available between the electronics module 100 and mobile device 300 (FIG. 1).

The processor 105 is connected to the interface 103 via an analog-to-digital converter (ADC) front end 113 and an electrostatic discharge (ESD) protection circuit 115. The ADC frontend 113 converts the raw analog signal received from sensing components of the garment 200 into a digital signal. The ADC frontend 113 may also perform filtering operations on the received signals. The interface 103 is conductively connected to electrodes 213 via electrically conductive pathways 207.

The electronics module 100 comprises a temperature sensor 119. The temperature sensor 119 may be arranged to monitor a core body temperature, ambient temperature, or skin-surface temperature of the user. The temperature sensor 119 may be a contact temperature sensor or a non-contact temperature sensor such as an infrared thermometer. Example contact temperature sensors include thermocouples and thermistors.

The electronics module 100 further comprises one or more output units 121, 123 such a as haptic feedback unit 121 and a light source 123. The haptic feedback unit 121 may be arranged to provide vibrational feedback to the user. The light source 123 may be arranged to emit light to indicate a status of the electronics module 100 or a property of a user wearing the wearable article, for example, or to provide any other form of feedback to the user.

The electronics module 100 may comprise any other form of sensor such as to monitor the property of the user or the environment around the user. The sensor may comprise an altitude sensor, presence sensor, or air quality sensor. The presence sensor may for detecting a touch input from a user. The presence sensor may comprise one or more of a capacitive sensor, inductive sensor, and ultrasonic sensor. Other examples of sensor are provided throughout this specification. The sensor may be, for example, a humidity sensor arranged to monitor a hydration or sweat level of the user.

The power source 111 in this example is a lithium polymer battery 111. The battery 111 is rechargeable and charged via a USB C input 137 of the electronics module 100. Of course, the present disclosure is not limited to recharging via USB and instead other forms of charging such as inductive of far field wireless charging are within the scope of the present disclosure. Additional battery management functionality is provided in terms of a charge controller 139, battery monitor 141 and regulator 143. These components may be provided through use of a dedicated power management integrated circuit (PMIC). The processor 105 is communicatively connected to the battery monitor 141 such that the processor 105 may obtain information about the state of charge of the battery 111.

The electronics module 100 also comprises a radio-frequency antenna 125. The radio-frequency antenna 125 may, for example, be any form of communication antenna. The antenna 125 may be a short-range communication antenna 125 arranged to transmit and/or receive data over a communication range of up to 50 metres, optionally up to 30 metres, optionally up to 10 metres, and optionally up to 1 metre. The short-range communication antenna 125 may comprise one or more of a near field communication, NFC, wireless body area network, BAN, and a wireless personal area network, PAN, communication antenna. The short-range communication antenna may comprise one or more of a NFC, Bluetooth®, Bluetooth® Low Energy, Bluetooth® Mesh, Bluetooth® 5, Thread, Zigbee, IEEE 802.15.4, and Ant communication antenna.

The electronics module 100 also comprises conventional electronics components including a power-on-reset generator 35, a development connector 133, a crystal 131, and a PROG header 129. Additionally, the electronics module 100 may comprise a button 127 for allowing the user to control the electronics module 100 although this function may also be provided by the motion sensor 107.

Figure 5:
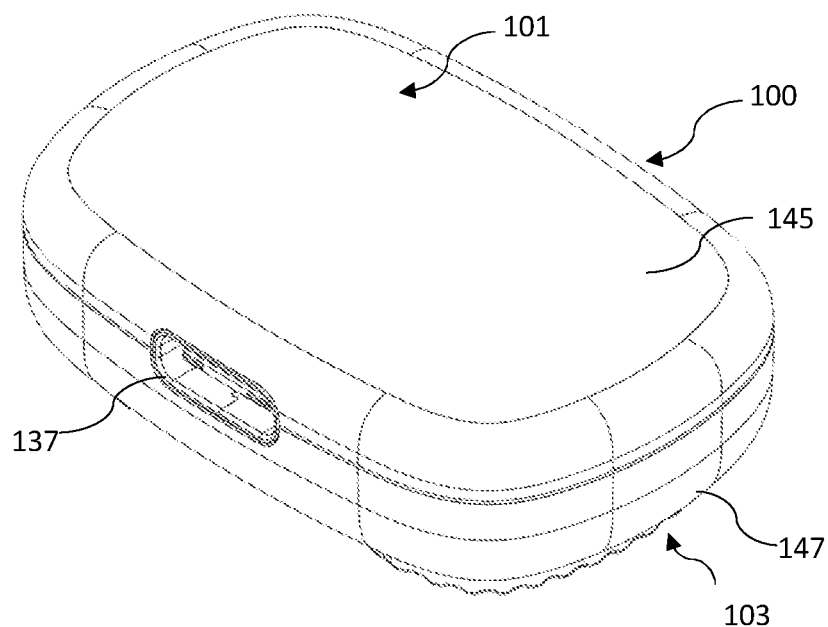
FIGS. 5 and 6 show perspective views of an example electronics module according to aspects of the present disclosure.
Figure 6:
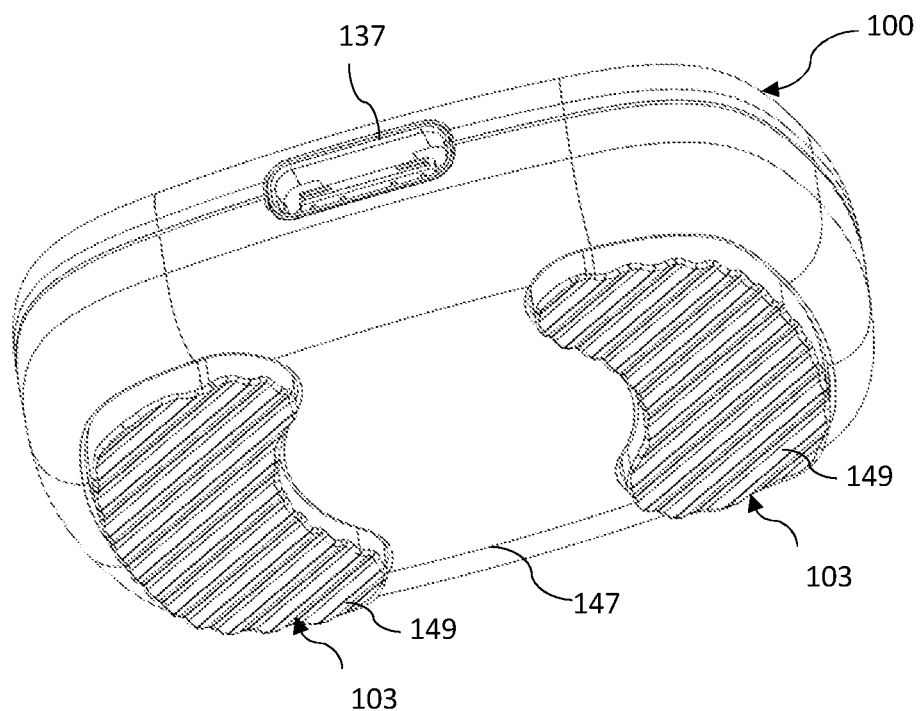

FIGS. 5 and 6 show an example electronics module 100 according to aspects of the present disclosure. The electronics module 100 comprises a rigid housing 101 and a plurality (two in this example) of contact pads 103 that are attached to an external surface of the rigid housing 101 and spaced apart from one another. The contact pads 103 in this example are constructed from a flexible material, and in particular a flexible conductive material. The contact pads 103 therefore form an outer layer of flexible material that covers a part of the rigid housing 101. Rigid contact pads 103 such as those made from a rigid metallic material are also within the scope of the present disclosure.

The rigid housing 101 comprises a top enclosure 145 and a bottom enclosure 147. The top and bottom enclosures 145 and 147 are snap fitted together. A sealant material such as bead of silicon may be applied to the lip of one or both of the top and bottom enclosures 145, 147 prior to joining them together so as to form a water-tight seal at the join between the top and bottom enclosure 147. This may beneficially protect against water ingress into the electronics module 100. The use of a two or more enclosures which are coupled together such as the top enclosure 145 and the bottom enclosure 147 is not required in all examples of the present disclosure. A single piece housing such as one which is overmoulded over the components of the module 100 is also within the scope of the present disclosure. Alternatively or additionally, the top enclosure 145 and the bottom enclosure 147 may be joined together by screws, sonic welding, glue or by any other means known to those skilled in the art.

The contact pads 103 are formed of two separate pieces of conductive elastomeric material 103 that form first and second flexible conductors 103. The conductive elastomeric material used in this example is a conductive silicone rubber material, but other forms of conductive elastomeric material may be used. Beneficially, elastomeric material such as conductive silicone rubber can have an attractive visual appearance and may easily be moulded or extruded to have branded or other visual elements.

The elastomeric material is made conductive by distributing a conductive material into the elastomeric material. Conductive particles such as carbon black and silica are commonly used to form conductive elastomeric materials but the present disclosure is not limited to these examples. https://en.wikipedia.org/wiki/Conductive elastomer-cite_note-4 The contact pads 103 may also comprise a 2D electrically conductive material such as graphene or a mixture or composite of an elastomeric material and a 2D electrically conductive material.

The contact pads 103 define an external surface 149 that faces away from the bottom enclosure 147. The surface 149 is arranged to interface with an external component so as to couple signals between the external component and a controller of the electronics module. The external component may be a conductive region of the wearable article or a skin surface of the wearer amongst other examples. The external component is typically the connection regions 205 (FIG. 2) of the garment 200. The surface 149 is textured to provide additional grip when positioned on the garment 200 or the skin surface. The texture may be, for example, a ribbed or knurled texture. The elastomeric material 103 shown in the Figures has a ribbed texture. The contact pads 103 may be flat and are not required to have a textured surface.

The electronics module 100 further comprises a charging interface 137 for coupling the electronics module 100 to a further device so as to charge a battery of the electronics module 100 and/or transfer data between the electronics module 100 and the further device. The charging interface 137 is a USB-C interface.

FIGS. 7 to 15 show how the electronics module 100 may be positioned on the garment 200 so that the interface elements 103 of the electronics module 100 are brought into communication with the connection regions 205 of the garment 200.

Figure 7:
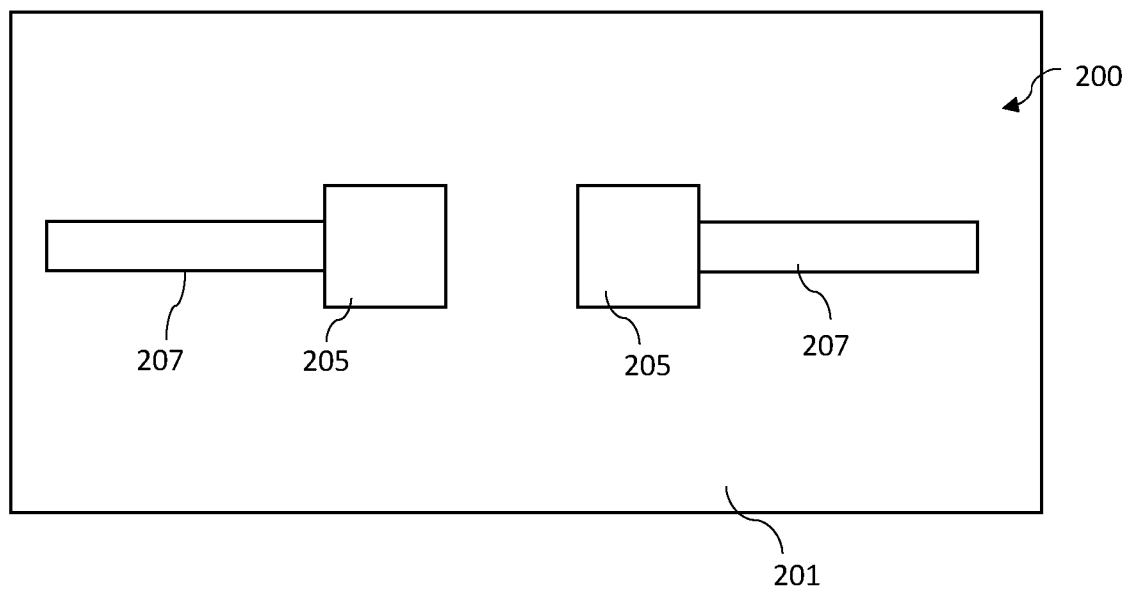
FIG. 7 shows a view of first surface of a wearable article according to aspects of the present disclosure.
Figure 8:
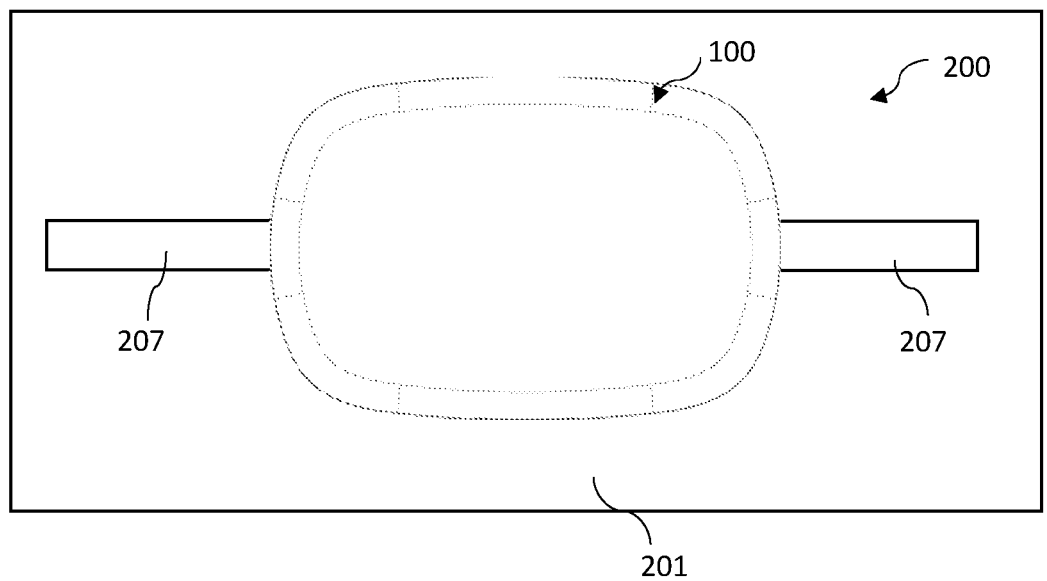
FIG. 8 shows an electronics module positioned on the first surface of the wearable article of FIG. 7.
Figure 9:
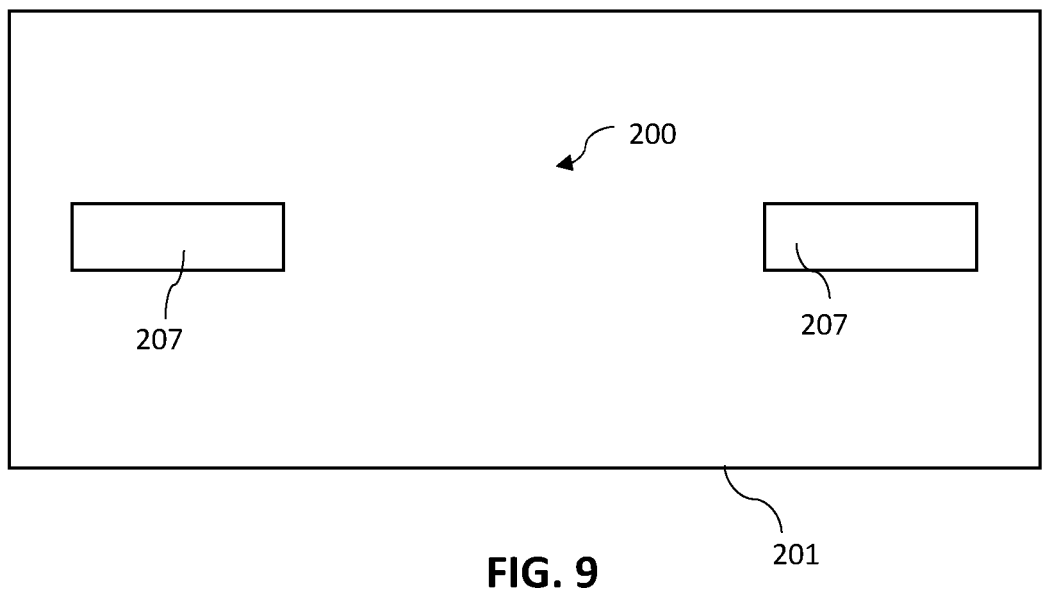
FIG. 9 shows a view of a second surface of the wearable article of FIG. 7.

FIG. 7 shows the garment 200 in isolation. The garment 200 comprises a textile layer 201 on which the connection regions 205 and conductive pathways 207 are provided. FIG. 8 shows the electronics module 100 positioned on the textile layer 201. FIG. 9 shows the underside surface of the textile layer 201 on which the electrodes 207 are provided.

Figure 10:
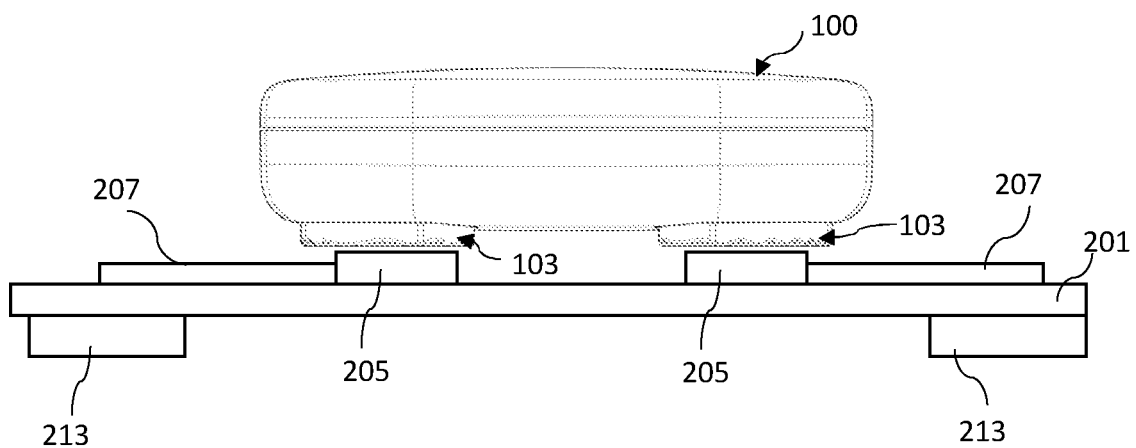
FIG. 10 shows a sectional view of the wearable article of FIG. 7 with the electronics module positioned on the first surface of the wearable article.

FIG. 10 is a sectional view. The electronics module 100 is positioned on the textile layer 201 such that the interface elements 103 are brought into contact with the connection regions 205. In this way, the interface elements 103 are brought into communication with the electrodes 213 via the conductive pathways 207.

While the electronics module 100 may be retained by an electronics module holder 203 (FIG. 2) of the garment to hold the electronics module 100 in place and in contact with the connection regions 205, it is still possible for the electronics module 100 to be positioned in sub-optimal contact with the connection regions 205. This may be caused by the electronics module 100 moving out of optimal alignment with the connection regions 205 due to motion of the user wearing the garment 200 or may be caused by other factors such as user error when coupling the electronics module 100 to the electronics module holder 203. For example, the user may incorrectly insert the electronics module 100 into the pocket 203 (FIG. 2).

Figure 11:
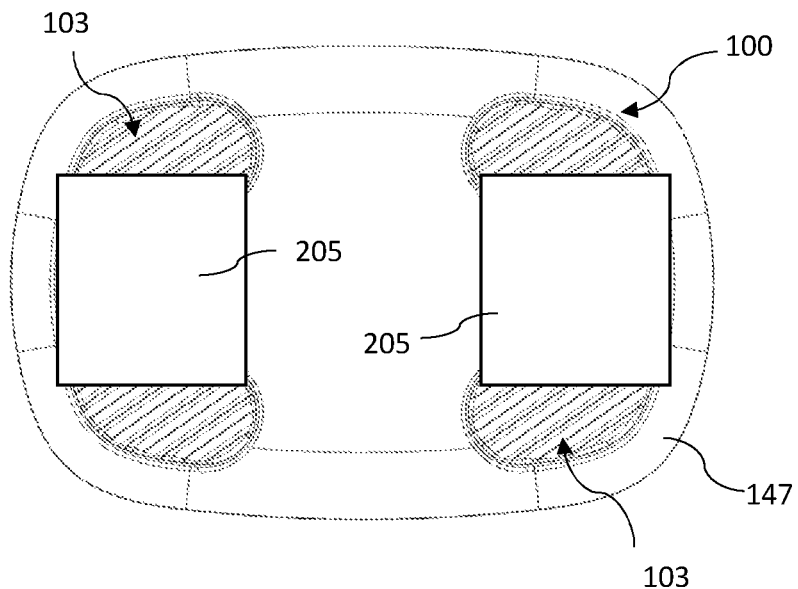
FIGS. 11 to 15 show different positional relationships between interface elements of the electronics module and connection regions of the wearable article according to aspects of the present disclosure.

FIG. 11 shows an example optimum arrangement between the electronics module 100 and the connection regions 205. The contact pads 103 cover a substantial part of the connection regions 205 so as to maximise the surface area of overlap between the contact pads 103 and the connection regions 205.

Figure 12:
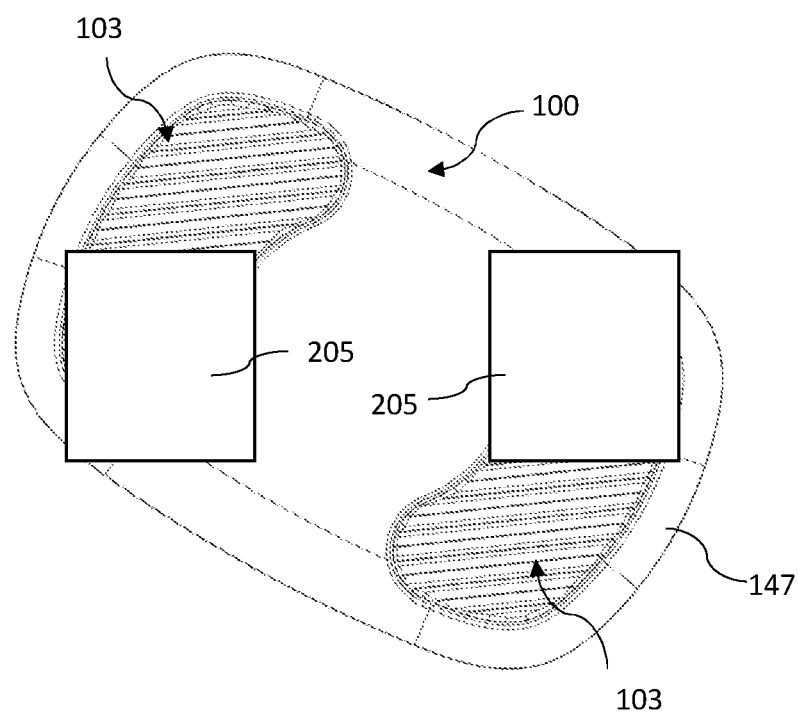
Figure 13:
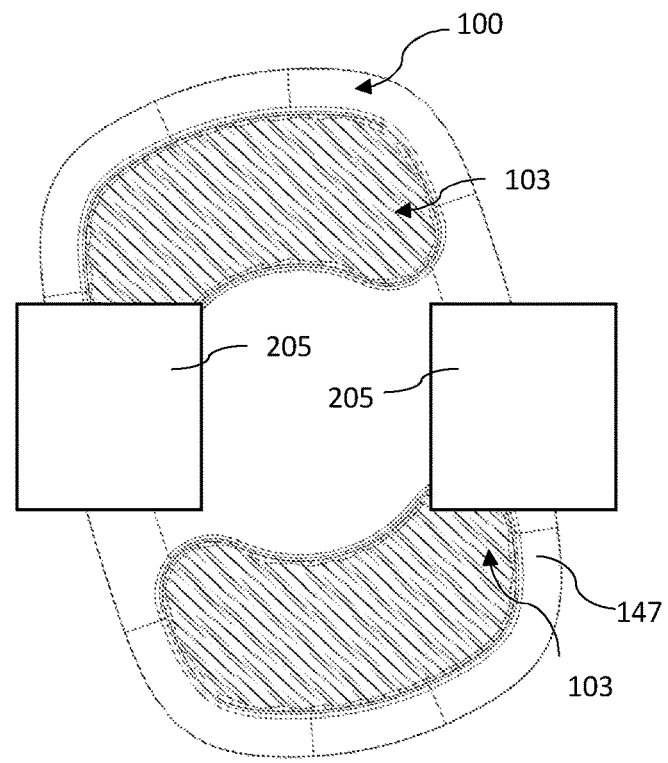
Figure 14:
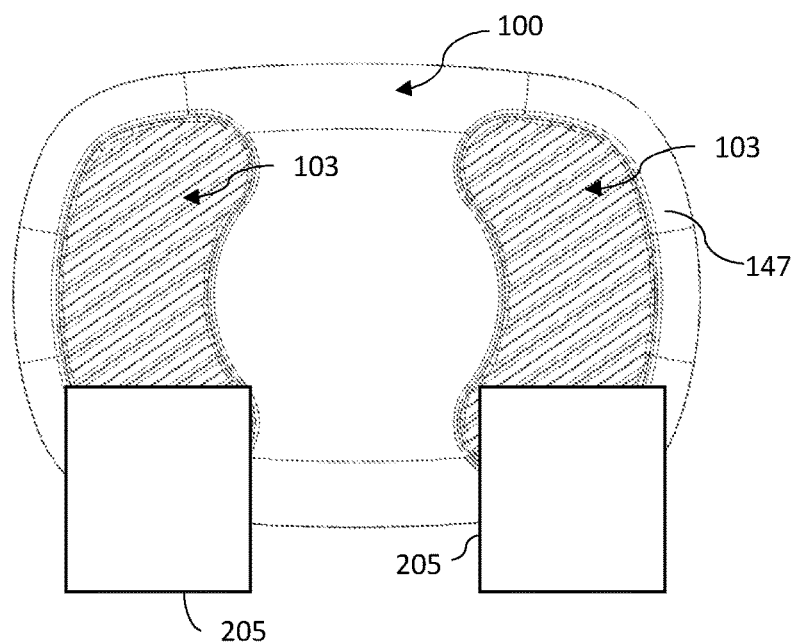
Figure 15:
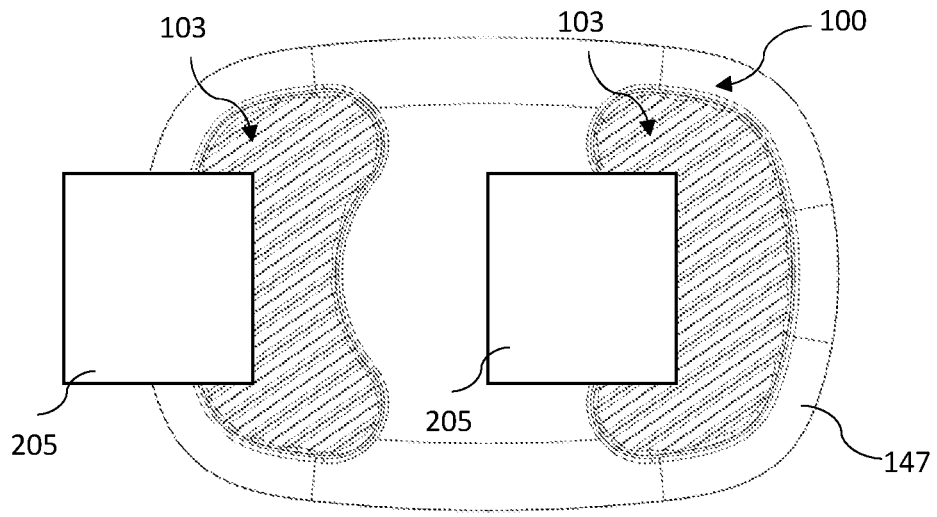

FIGS. 12 and 13 show examples where the electronics module 100 has been rotated relative to the connection regions 205. FIGS. 14 and 15 show examples where the electronics module 100 has shifted relative to the connection regions 205. In these examples, the contact pads 103 are still in contact with their respective connection regions 205 but the area of overlap between the contact pads 103 and the connection regions 205 are reduced. This means that while a measurement signal is still obtained, the amplitude of the measurement signal is reduced. Low amplitude signal data may not provide an accurate indication of the state of the user. Consequently, algorithms that process the measurement data analyse the physiological condition and/or provide recommendations to the user may generate inaccurate results.

In other examples, the electronics module 100 may be positioned at an angle such that it has good placement with respect to one connection region 205, but poor placement with respect to another connection region 205.

Low amplitude signal data is not limited to incorrect positioning of the electronics module 100 in the pocket 203, other forms of poor contact between the interface elements 103 and the connection regions 205 can result in low amplitude signal data. The low amplitude signal data may be cause by factors such as damage or obstruction caused to the connection regions 205 or the interface elements 103. For example, if the garment is poorly washed, or maybe it is washed not in a garment bag, lint and other debris may enter the pocket and obstruct the contact.

The user could inspect the received data via an application running on the mobile device 300 to determine whether the obtained data is of the expected quality and apply a correction if so. The correction may include repositioning the electronics module 100. However, if the user does not notice the error in the signal data, then low-quality data will continue to be collected. The user may be performing a training session and the recorded data may be used to provide recommendations to the user to improve their performance. The user may be performing a medical evaluation and the recorded data may be used to provide recommendations to the user to improve their health. Receiving low-quality data means that the data recorded during the session will not be useable to generate useful recommendations.

It is an object of the present disclosure to provide a mechanism for automatically (i.e. without user input) notifying the user that there is an anomaly in the communicative connection between the electronics module 100 and the wearable article 200. This anomaly is indicative of low-quality data being recorded. This notification prompts the user to adjust the mechanical coupling between the electronics module 100 and the wearable article 200 so as to adjust the communicative connection between the electronics module and the wearable article.

In an example implementation according to aspects of the present disclosure, the electronics module 100 is brought into removable mechanical coupling with the wearable article 200. The electronics module 100 may be retained in a pocket 203 (FIG. 2) of the wearable article 200 or other form of electronics module holder/mechanical coupling. When mechanically coupled to the wearable article 200, the electronics module 100 forms a communicative connection with the wearable article 200 so as to receive measurement data from the wearable article 200.

As per the examples of FIGS. 1 to 15, the electronics module 100 may comprise an interface 103 that forms the communicative connection with the wearable article 200. The interface 103 is not required to form a conductive connection with the wearable article 200. An inductive connection may additionally or separately be formed to allow for communication between the electronics module 100 and the wearable article 200. An inductive connection may be affected by other elements in proximity to the electronics module 100 that may interfere with the communication between the electronics module 100 and the wearable article. For example, the electronics module 100 may be placed in a pocket of the wearable article 200 with other components such as keys or NFC-enabled payment cards. These items may obscure the inductive coupling due to their metal/antenna content.

At least one processor analyses measurement data obtained by the electronics module 100 when the electronics module 100 is mechanically coupled with the wearable article 200 to determine whether an anomaly condition is present. The anomaly condition is indicative of an anomaly in the communicative connection between the electronics module 100 and the wearable article 200. If the anomaly condition is present, the at least one processor triggers the generation of a notification to prompt the user to adjust the mechanical coupling between the electronics module 100 and the wearable article 200 so as to adjust the communicative connection between the electronics module 100 and the wearable article 200.

Advantageously, a user is automatically notified of an anomaly in the communicative connection between the electronics module 100 and the wearable article 200. In this way, a user is not required to manually inspect incoming measurement data to determine whether a good communicative connection has been formed. The issue of the user inadvertently recording low quality measurement data is thus avoided.

Adjusting the mechanical coupling between the electronics module 100 and the wearable article 200 may comprise removing and reinserting the electronics module 100 into the electronics module holder 203 of the wearable article 200 or otherwise performing translational or rotational movement on the electronics module 100 to change its position on the wearable article 200.

The anomaly is determined based on measurement data which may be measurement data obtained by the electronics module 100.

In examples, the analysed measurement data comprises measurement data received by the electronics module 100 over the communicative connection between the electronics module 100 and the wearable article 200. The measurement data may comprise measurement data received by the electronics module 100 via the interface 103 that couples with the measuring electrodes 213 via conductive pathways 207 of the wearable article 200.

In examples, the at least one processor determines a signal-quality measure of the measurement data and uses this to determined whether an anomaly condition is present. The signal quality measurement may be compared to a predetermined threshold so as to determine whether the anomaly condition is present. The anomaly condition is present if the signal quality measure is less than the predetermined threshold value. The predetermined threshold may be fixed for all users or may be a user dependent threshold value. The predetermined threshold may be selected based on characteristics of the user wearing the wearable article. The characteristics may include one or more of the age, weight, height, gender, ethnicity, body fat percentage, fitness level, fitness history, medical history. Selecting the predetermined threshold based on characteristics of the user wearing the wearable article provides more reliable detection of whether an anomaly condition is present. The user characteristics may be manually input by the user or may be pulled from other sources such as other health and fitness services running or accessible on the mobile device of the user. The user characteristics may be derived from information received about the user. For example, if the user frequently meets a fitness goal, it may be derived that the user is relatively active and an appropriate threshold may be selected accordingly.

The present disclosure is not limited to any particular signal-quality measure. Any signal-quality measure may be selected by the skilled person based on factors such as the type of the measurement data, whether the processing is performed in the digital or analogue domain, and the computational resources of the at least one processor.

In examples, a signal-quality measure such as the signal-to-noise ratio may be used to determine whether an anomaly condition is present. The signal-to-noise ratio may be defined as:

$$SNR = 10.\log_{10}\left(\frac{\sigma_x^2}{\sigma_c^2}\right),$$

where $\sigma_x^2$ is the variance of the signal, and $\sigma_c^2$ is the variance of the noise.

In examples, a signal-quality measure may be determined from an amplitude of the measurement data. The amplitude of the measurement data may be determined by calculating the root mean square of the data. The root mean square may be defined as $$x_{RMS} = \sqrt{\frac{1}{n}(x_1^2 + x_2^2 + \ldots + x_n^2)}$$

for a set of n values $\{x_1, x_2, \ldots, x_n\}$ in the digital domain. The root mean square may also be defined as $$f_{RMS} = \sqrt{\frac{1}{T_2 - T_1} \int_{T_1}^{T_2} [f(t)]^2 dt}$$

for a given time interval $T_1 \leq t \leq T_2$ in the analogue domain. The amplitude of the measurement data may be determined from the peak amplitude of the data during a given time interval. The amplitude of the measurement data may be determined by identifying the peaks during a given time interval and determining the average amplitude of the peaks in the given time interval. The time intervals may be any time period selected as appropriate by the skilled person. The time intervals may be between 0.5 seconds and 30 seconds, 0.5 seconds and 25 seconds, 0.5 seconds and 20 seconds, 0.5 seconds and 15 seconds, 0.5 seconds and 10 seconds, 0.5 seconds and 5 seconds, 0.5 seconds and 4 seconds, 0.5 seconds and 3 seconds, 0.5 seconds and 2 seconds, 0.5 seconds and 1 second. The time intervals may be between 1 second and 30 seconds, 2 seconds and 30 seconds, 3 seconds and 30 seconds, 4 seconds and 30 seconds, 5 seconds and 30 seconds, 10 seconds and 30 seconds, 15 seconds and 30 seconds, 20 seconds and 30 seconds, and 25 seconds and 30 seconds.

The present disclosure is not limited to determining whether an anomaly condition is present based on measurement data received by the electronics module 100 over the communicative connection between the electronics module 100 and the wearable article 200. Additionally or separately, the measurement data analysed by the at least one processor may comprise measurement data obtained by a sensor of the electronics module 100 or external to the electronics module 100 such as a sensor of the mobile device 300.

The sensor may be the motion sensor 107 (FIG. 4). The motion sensor 107 is generally part of the electronics module 100. The measurement data obtained from the motion sensor 107 is indicative of the orientation of the electronics module 100 with respect to the wearable article 200. The electronics module 100 may have a reference position with respect to the wearable article 200. The reference position may be the position which maximises the surface area of contact between the interface 103 of the electronics module 100 and the connection regions 205 of the wearable article 100 as shown in FIG. 11. The difference between the reference position and the determined orientation of the electronics module 100 are compared by the at least one processor. If the electronics module is orientated away from the reference position by more than a predetermined value then an anomaly condition may be determined. A machine-learned model may be trained to recognise different orientations of the electronics module 100 relative to the garment 200.

The sensor may be a temperature sensor 119. The temperature sensor 119 is generally part of the electronics module 100. The measurement data obtained from the temperature sensor 119 is indicative of the contact between the electronics module 100 and the wearable article 200. If the temperature values are unexpectedly low or not present then it is indicative of an anomaly in the mechanical coupling between the electronics module 100 and the wearable article 200.

The sensor may be a humidity/moisture sensor. The humidity sensor may be part of the electronics module 100 or another device such as the mobile device 300 or may be part of the wearable article 200. The measurement data obtained from the humidity/moisture sensor is indicative of the contact between the electronics module 100 and the wearable article 200. An unexpectedly high or low humidity may be indicative of an anomaly in the mechanical coupling between the electronics module 100 and the wearable article 200. The humidity/moisture level may be indicative of an amount of sweat generated by the user or the humidity/moisture in the external environment such as due to the weather or location. The user may be by the sea, at the beach or a swimming pool, for example. The sensor may be any other form of environmental sensor which may sense a property of the environment that is indicative of an anomaly in the mechanical coupling between the electronics module 100 and the wearable article 200.

The measurement data may be location data obtained from a location sensor. The location data may be indicative of the location of the electronics module 100, wearable article 200 or the mobile device 300. The location may be determined from cellular data or Global Navigation Satellite System (GNSS) data, for example. The location data may be determined from a cellular communicator and/or GNSS receiver of the electronics module 100, wearable article 200 or the mobile device 300. The location data may indicate that the user is in an environment which may cause an anomaly in the mechanical coupling between the electronics module 100 and the wearable article 200

The sensor may be a combination of any of the sensors referred to above.

As explained above, if the anomaly condition is present, the at least one processor triggers the generation of a notification to prompt the user to adjust the mechanical coupling between the electronics module 100 and the wearable article 200 so as to adjust the communicative connection between the electronics module 100 and the wearable article 200. The processor triggers the generation of the notification by controlling an output unit to generate an output for prompting the user to adjust the mechanical coupling between the electronics module 100 and the wearable article 200. The notification may be one or a combination of an audible, visual and haptic feedback generated by the mobile device 300 (FIG. 1) of the user. Additionally or separately, the notification may be one or a combination of audible, visual and haptic feedback generated by the electronics module 100. The output unit may comprise the light source 123 (FIG. 4), haptic feedback unit 121 (FIG. 4) or an audio output unit of the electronics module 100.

The notification may not be generated as soon as an anomaly condition is detected. This is because an anomaly condition may be caused by a temporary event such as poor electrode contact due to excessive, sudden user motion. Instead, the at least one processor may continue to monitor the measurement data for a time interval after the anomaly condition has been detected so as to confirm that the anomaly condition is persistent in the measurement data. The notification may then be generated after the time interval has elapsed. The time interval may be between 1 second and 30 seconds, 1 second and 25 seconds, 1 second and 20 seconds, 1 second and 15 seconds, 1 second and 10 seconds, 1 second and 5 seconds, 1 second and 4 seconds, 1 second and 3 seconds, and 1 seconds and 2 seconds. The time interval may be between 2 seconds and 30 seconds, 3 seconds and 30 seconds, 4 seconds and 30 seconds, 5 seconds and 30 seconds, 10 seconds and 30 seconds, 15 seconds and 30 seconds, 20 seconds and 30 seconds, and 25 seconds and 30 seconds.

The notification may additionally prompt the user to adjust the coupling between a sensing component of the wearable article 200 and the skin surface of the user. The notification may prompt the user to apply liquid to the coupling between the sensing component and the skin surface so as to improve the communicative coupling between the sensing component and the skin surface.

Additionally or separately, in response to detecting an anomaly condition, the at least one processor may trigger the electronics module 100 to perform a self-test. The self-test may be performed prior to generating the notification. The self-test may be performed after the user has already attempted to adjust the mechanical coupling between the electronics module 100 and the wearable article 200 but the anomaly condition has persisted. The self-test may be used to determine whether there is a failure in the electronics module 100 rather than in the communicative coupling between the electronics module 100 and the wearable article 200. The self-test may be performed by injecting a calibration voltage into the electronics module 100 and reading the voltage back. If the readback is outside of a predetermined range of the injected voltage, then it is determined that the electronics module 100 has a failure.

In some examples, the at least one processor is part of the electronics module 100. That is, the electronics module 100 determines whether an anomaly condition is present and triggers the generation of a notification if so. The at least one processor may controller the communicator 109 of the electronics module 100 to transmit the notification to the mobile device 300 (FIG. 1).

In some examples, the at least one processor is part of the mobile device 300. That is, the mobile device 300 determines whether an anomaly condition is present and triggers the generation of a notification if so. In these examples, the electronics module 100 transmits the measurement data to the mobile device 300 for performing the analysis of the measurement signals. The electronics module 100 may perform no processing on the measurement data or may perform operations such as but not limited to analogue-to-digital conversion and noise filtering.

In a particular example involving the electronics module 100 of any of FIGS. 1 to 15, the electronics module 100 is initially positioned on the wearable article 200 such that the pair of interface elements 103 of the electronics module 100 contact and are conductively connected to the connection regions 205 of the wearable article 200. The electronics module 100 is positioned incorrectly on the wearable article 200 and may resemble the arrangement shown in FIGS. 12 to 15.

The electronics module 100 receives measurement data from the electrodes 213 of the wearable article via the conductive pathways 207. The measurement data in this example is in the form of an electrocardiography (ECG) signal which is a differential voltage measured across the pair of electrodes 213. The ADC 113 (FIG. 4) converts the analogue voltage signal to a digital value. The digital value 105 is received by the processor 105.

The processor 105 receives a time series of digital voltage values from the ADC 113. The processor 105 determines from the set of n values one or more peaks in the signal. The peaks in the signal typically are representative of the peak in the R wave of the ECG signal. The processor 105 compares the peak voltage to a predetermined threshold voltage. If the peak voltage is below a predetermined threshold then an anomaly condition is determined to be present.

The processor 105 continues to monitor the incoming digital voltage values for a preset time interval and compares the incoming voltage peaks to the reference voltage value. If the anomaly condition persists, the processor 105 controls the communicator 109 to transmit a notification to the mobile device 300. An application running on the mobile device 300 will generate one or more of a visual, audible and haptic feedback to prompt the user to adjust the mechanical coupling between the electronics module 100 and the wearable article 200 so as to adjust the communicative connection between the electronics module 100 and the wearable article 200. In particular, the user will be prompted to move the electronics module 100 into the reference position as shown in FIGS. 8 and 11.

Figure 16:
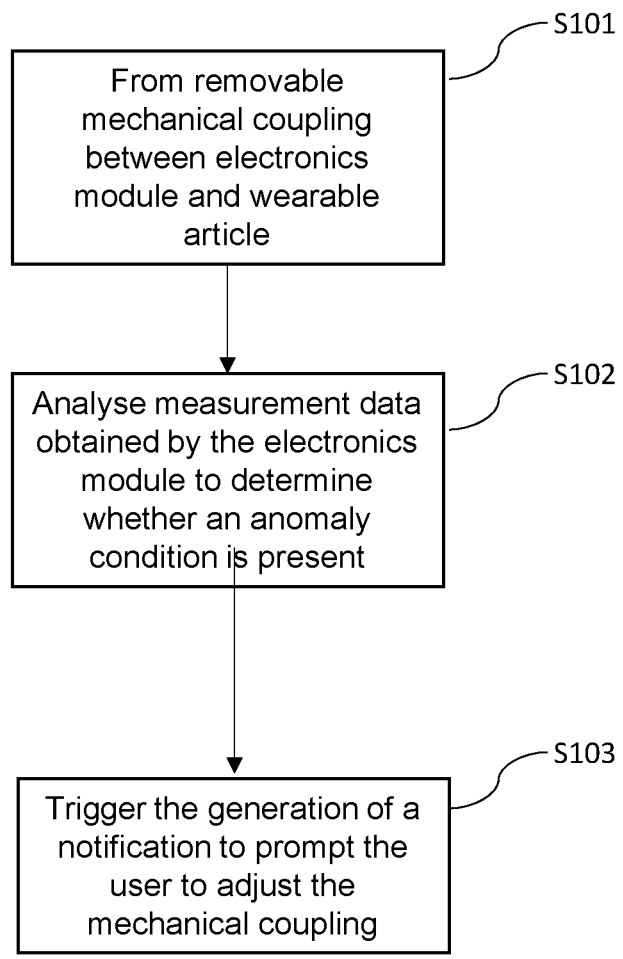
FIG. 16 shows a flow diagram for an example method according to aspects of the present disclosure.

Referring to FIG. 16, there is shown a process flow diagram for an example method according to examples aspects of the present disclosure.

Step S101 comprises forming a removable mechanical coupling between an electronics module and a wearable article, wherein the electronics module forms a communicative connection with the wearable article so as to receive measurement data from the wearable article when the electronics module is mechanically coupled to the wearable article.

Step S102 comprises analysing measurement data obtained by the electronics module when the electronics module is mechanically coupled with the wearable article to determine whether an anomaly condition is present, wherein the anomaly condition is indicative of an anomaly in the communicative connection between the electronics module and the wearable article.

Step S103 comprises triggering the generation of a notification to prompt the user to adjust the mechanical coupling between the electronics module and the wearable article so as to adjust the communicative connection between the electronics module and the wearable article.

In some examples of the present disclosure, rather than or in addition to triggering the generation of a notification if the anomaly condition is present, the at least one processor triggers a compensation to be applied to measurement data obtained by the electronics module so as to compensate for the anomaly in the communicative connection between the electronics module and the wearable article. In this way, the anomaly is compensated for/corrected without necessarily requiring the user to adjust the mechanical connection between the electronics module and the wearable article. This situation may occur due to an obstruction/degradation in the interface and/or the sensing components of the wearable article for example. The generation of the notification may be only be triggered if the obtained measurement data is not suitable for being compensated/corrected.

This approach may beneficially be performed if the measurement data obtained by the electronics module corresponds to characteristic measurement data. By corresponds, it is not required that the measurement data is the same as the characteristic measurement data but rather shares one or more properties with the measurement data. For example, the measurement data obtained by the electronics module may have a low amplitude/intensity which triggers the detection of the anomaly condition but has a shape which corresponds to that of characteristic measurement data. The characteristic measurement data may be data for the user of the electronics module and may be or may be derived from a previously obtained waveform for the user. The shape may be determined based on one or more factors such as the number of peaks in the measurement data, the relative spacing between peaks, the area under the peaks, and the amplitude difference between peaks and troughs. Of course, other measures for comparing shapes of signals are within the scope of the present disclosure.

Turning to ECG data, as an example, the R peak amplitude may be sufficiently low to trigger the anomaly condition, but the shape of the ECG data as defined by the PQRST features of the obtained ECG data may correspond to characteristic ECG data for the user. In this situation, the anomaly can be corrected/compensated for by scaling the obtained ECG data by a scaling factor. This can allow for the anomaly to be corrected without sending a notification to the user. That is, the generation of the notification may only be triggered if the measurement data does not correspond to characteristic measurement data. This provides an enhanced user experience as the user is only provided with notifications when the anomalies are unable to be compensated for by processing the measurement data.

There is also disclosed a mechanism for correcting for accidental positioning of the electronics module 100 upside down. As shown in FIGS. 7 to 11, the electronics module 100 has a plurality (two in this example) of interface elements 103 (contact pads 103) that are each associated with a corresponding connection region 205 on the wearable article 200. It is possible for a user to inadvertently position the electronics module 100 upside down such that while the contact pads 103 are still coupled to connection regions 205, they are connected to the incorrect connection region. For example, if the electronics module 100 as shown in FIG. 11 is rotated through 180 degrees about its longitudinal axis, the interface elements 103 will be connected to different connection regions. The interface element 103 shown on the left in FIG. 11 would be connected to the connection region 205 shown on the right. The interface element 103 shown on the right in FIG. 11 would be connected to the connection region 205 shown on the left. As a consequence, the incoming ECG signals will appear upside down and have characteristic peaks with negative amplitude.

The electronics module 100 is able to determine when the interface elements 103 are connected to the wrong connection regions 205 and apply an appropriate correction to the incoming signals (e.g. by inverting the signal) to avoid the user having to reinsert the electronics module 100 in the correct orientation. The electronics module 100 may perform this determination using the ECG signals and/or any other suitable data such as from data from the motion sensor (e.g. accelerometer data, gyroscope data), bioimpedance data, or any other suitable sensor such as surface electromyography sensors.

While the examples show electronics modules 100 with two contact pads 103 it will be appreciated that the present disclosure is not limited to any particular number of contact pads 103 or more generally interfaces 103. One interface 103 may be provided. The interface 103 is not required to form a conductive connection. Wireless communication such as inductive communication between the electronics module 100 and the wearable article 200 is within the scope of the present disclosure.

In summary, the system 10 comprises an electronics module 100 removably mechanically coupled to a wearable article 200. The electronics module 100 forms a communicative connection with the wearable article 200 to receive measurement data from the wearable article 200. A processor analyses measurement data obtained when the electronics module 100 is mechanically coupled with the wearable article 200 to determine whether an anomaly condition is present. The anomaly condition is indicative of an anomaly in the communicative connection between the electronics module 100 and the wearable article 200. If the anomaly condition is present, the processor triggers the generation of a notification to prompt the user to adjust the mechanical coupling between the electronics module 100 and the wearable article 200 so as to adjust the communicative connection between the electronics module 100 and the wearable article 200. Additionally or separately, if the anomaly condition is present, the processor triggers a compensation to be applied to obtained measurement data so as to compensate for the anomaly in the communicative connection between the electronics module 100 and the wearable article 200.

In the present disclosure, the electronics module may also be referred to as an electronics device or unit. These terms may be used interchangeably.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA), programmable System on Chip (pSoC), or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A system comprising:
   an electronics module arranged to be removably mechanically coupled to a wearable article, and arranged to integrate with a sensing component incorporated into the wearable article, the electronics module forming a communicative connection with the sensing component incorporated into the wearable article so as to receive measurement data from the sensing component incorporated into wearable article over the communicative connection between the electronics module and the sensing component incorporated into the wearable article when the electronics module is mechanically coupled to the wearable article; and at least one processor operable to:

analyse the measurement data obtained from the sensing component when the electronics module is mechanically coupled with the wearable article to determine whether an anomaly condition is present, wherein the anomaly condition is indicative of an anomaly in the communicative connection between the electronics module and the sensing component incorporated into the wearable article; and if the anomaly condition is present, trigger the generation of a notification to prompt the user to adjust the mechanical coupling between the electronics module and the wearable article so as to adjust the communicative connection between the electronics module and sensing component incorporated into the wearable article, wherein the electronics module comprises the at least one processor, and wherein the processor being operable to trigger the generation of a notification comprises the processor being operable to control the electronics module to transmit the notification to a further device.

2. The system according to claim 1, wherein the processor being operable to analyse the measurement data comprises the processor being operable to determine a signal-quality measure of the measurement data.

3. The system according to claim 2, wherein the processor being operable to determine the signal-quality measure comprises the processor being operable to determine an amplitude of the measurement data.

4. The system according to claim 2, wherein the processor is operable to compare the signal-quality measure to a predetermined threshold value so as to determine whether the anomaly condition is present, and the anomaly condition is present if the signal quality measure is less than the predetermined threshold value.

5. The system according to claim 4, wherein the predetermined threshold is determined based on one or more characteristics of the user.

6. The system according to claim 1, wherein the sensor of the electronics module comprises a motion sensor, and wherein the measurement data is indicative of the orientation of the electronics module with respect to the wearable article.

7. The system according to claim 6, wherein the at least one processor is operable to compare the orientation of the electronics module to a reference position, and wherein the anomaly condition is present if the electronics module is orientated away from the reference position by more than a predetermined value.

8. The system according to claim 1, wherein the electronics module comprises an interface that forms the communicative connection with the wearable article.

9. The system according to claim 8, wherein the interface is brought into proximity or contact with the wearable article so as to form the communicative connection with the wearable article.

10. The system according to claim 9, wherein the interface is brought into contact with a connection region of the wearable article, wherein the interface and the connection region comprise conductive materials so as to form a conductive coupling, and wherein the measurement data is received over the conductive coupling.

11. The system according to claim 8, wherein the interface comprises a plurality of interface elements that each form a communicative connection with the wearable article.

12. The system according to claim 1, further comprising an output unit, and wherein the processor being operable to trigger the generation of a notification comprises the processor controlling the output unit to generate an output for prompting the user to adjust the mechanical coupling between the electronics module and the wearable article.

13. The system according to claim 12, wherein the output comprises one or more of an audio output, a visual output, and a haptic output.

14. The system according to claim 12, wherein the further device comprises the output unit.

15. The system according to claim 1, wherein the further device is a mobile device.

16. The system according to claim 1, further comprising the wearable article.

17. A method comprising:

forming a removable mechanical coupling between an electronics module and a wearable article, wherein the electronics module forms a communicative connection with a sensing component incorporated into the wearable article so as to receive measurement data from the sensing component incorporated into wearable article when the electronics module is mechanically coupled to the wearable article; and analysing, by a processor of the electronics module, measurement data obtained from the sensing component when the electronics module is mechanically coupled with the sensing component incorporated into wearable article to determine whether an anomaly condition is present, wherein the anomaly condition is indicative of an anomaly in the communicative connection between the electronics module and the wearable article; and triggering, by the processor of the electronics module, the generation of a notification to prompt the user to adjust the mechanical coupling between the electronics module and the sensing component incorporated into wearable article so as to adjust the communicative connection between the electronics module and the sensing component incorporated into wearable article, wherein the triggering of the generation of the notification comprises transmitting the notification to a further device.

* * * * *